Patented June 3, 1952

2,598,742

UNITED STATES PATENT OFFICE 2,598,742

SMELTING OF ZINCIFEROUS ORE

Erwin C. Handwerk, Lehighton, and George T. Mahler, Palmerton, Pa., assignors to The New Jersey Zinc Company, New York, N. Y., a corporation of New Jersey No Drawing. Application September 2, 1949, Serial No. 113,901

5 Claims. (Cl. 75—14)

This invention relates to the smelting of zinciferous ore and, more particularly, to the electric furnace smelting of such ore.

Electric furnace smelting of zinc offers many attractions including simplicity of charge preparation and furnace operation as compared to those zinc smelting practices now in use. There have been innumerable proposals presented heretofore for the electric furnace smelting of zinciferous ores wherein a dry charge of the ore and reducing material is melted down with the concomitant liberation of metallic zinc vapor, but to the best of our knowledge no such operation has ever been put into commercial practice. It has been the experience of those who have tried the prior art proposals that the relatively high dust content and high carbon dioxide content of the zinc vapor-bearing gases produced in an electric furnace preclude successful practical condensation of the zinc vapor to molten metal. The dust in such furnace operation appears to be produced by volatilization, along with the zinc vapor, of certain impurities which re-solidify in the furnace atmosphere. The resulting dust-like particles serve as nuclei for condensation and freezing of zinc vapor in the form of small particles known as physical blue powder. The small particles of dust-forming impurities, which are predominantly metal oxides, also appear to catalyze the dissociation of carbon monoxide in the furnace gases to carbon dioxide and carbon when the temperature of the gases falls to about 900° C. and below. The resulting carbon dioxide is a powerful oxidizing agent for zinc vapor, and its action on the zinc vapor in the furnace gases as the latter are being cooled in a zinc condenser is to produce chemical blue powder and rock oxide accretions which rapidly plug up the condenser.

We have now discovered that it is possible to smelt oxidic or oxidized zinciferous ores in an electric furnace with the resulting production of zinc vapor substantially free from volatilized dust-forming impurities. We have found that this result can be attained only by control of a combination of smelting conditions. These critical smelting conditions reside in an important relationship in the charge composition and in the manner in which the smelting is effected. Control of these critical conditions makes possible the smelting of a zinciferous ore with a carbonaceous reducing material in an electric furnace with the resulting production of metallic zinc vapor substantially free from dust-forming impurities and a substantially zinc-free molten slag. Our smelting method comprises charging the zinciferous ore and carbonaceous reducing material into the furnace in a loose, dry, condition, establishing in the charge composition an iron oxide content sufficient to provide by partial reduction thereof a body of molten iron product underlying said slag and at least 1½% iron oxide (calculated as Fe) in the molten slag, correlating the amount of reducing material to the zinc oxide and iron oxide components of the charge so as to effect reduction of all of the zinc oxide component of the ore to metallic zinc while effecting reduction of only such portion of the iron oxide component of the charge as to leave in the slag at least 1½% but not more than 6% by weight of iron oxide calculated as Fe, and smelting the charge on the surface of the molten slag at a temperature not in excess of 1450° C. The maintenance of the relatively low electric furnace smelting temperature not in excess of 1450° C., in accordance with our invention, is made possible by control of the manner of heating the furnace charge, by control of the fluidity of the slag wherein the furnace heat is concentrated and by utilization of the fresh charge as a means for absorbing heat in such manner as to aid in preventing the smelting temperature from exceeding about 1450° C.

The smelting method of our invention is applicable to any oxidic zinciferous ore whether naturally occurring in the oxidized state or obtained by roasting blende. We have successfully smelted such representative ores which further varied from one extreme to the other in their zinc content. For example, we have smelted, and condensed metallic zinc vapor therefrom with efficiencies exceeding 85%, such ores or ore mixtures as calcined Sterling Hill ore having a 20% zinc content, a mixture of sintered Buchans River and New Calumet ores together with calcined Sterling Hill crude having a resulting zinc content of 30%, a sintered mixture of Buchans River, New Calumet and green ore residues containing 60% zinc, and a mixture of straight flash roasted Avalos, Paragsha and green ore residues analyzing 67.5% zinc.

In smelting the aforementioned low grade ores, the slag tapped from the furnace contained only 0.1 to 0.75% zinc. The higher grade ores were smelted with the production of a slag containing about 0.5 to 1.5% zinc. The remainder of the zinc content of each charge was eliminated therefrom as metallic zinc vapor and was recovered. The lead and cadmium present in the ore were eliminated to the extent of 97–98% and were carried over in the zinc vapor. Only 0.02 to 0.3% iron has been detected in the condensed zinc metal, the amount of iron in the zinc depending upon the iron and zinc contents of the ore. Virtually all of the copper present in the ore is reduced and is concentrated in the iron product of the smelting operation. A major portion of the silver and gold contents of the ore charge appears in the iron product with the remainder of the silver and gold appearing in the condensed zinc metal. When manganese is present in the ore, as it is in the case of Sterling Hill ore, most of the manganese remains in the slag and the remainder appears in the iron product. Accordingly, except for manganese, when this element is present in the zinciferous ore smelted in accordance with our invention, all of the valuable constituents of the ore are recovered either in the condensed zinc metal or in the molten pig iron product.

Oxidic zinciferous ores generally comprise zinc, cadmium, lead, copper, silver and iron, essentially in the form of oxides, which are readily reducible by carbonaceous material at temperatures within the range of about 1100° to 1400° C., as well as oxides of calcium, magnesium and silicon which are not readily reducible under these conditions. Smelting temperatures in the range of 1100° to 1400° C. can readily be obtained in an electric furnace. However, in order to heat the entire mass of a smelting charge to a temperature within this range in an electric furnace, it is a characteristic of such heating operation that a substantial portion of the charge is heated to an appreciably higher temperature. We have found that when a portion of a charge derived from the reduction of oxidic zinciferous ore is heated to a temperature substantially above 1450° C., there is a pronounced tendency for one or more of the gangue constituents lime, magnesia and silica to be volatilized either directly or indirectly, or both. The lime, magnesia and silica may be volatilized directly in the form of the oxides per se, or they may be volatilized indirectly in the form of the metals themselves by reduction of the lime, magnesia and silica to metallic form followed by reoxidation of the volatilized metals by carbon monoxide and carbon dioxide in the furnace atmosphere. Volatilization of these gangue constituents in a relatively hot portion of the charge is followed by solidification of the vapors in a cooler portion of the furnace, and the solidified materials thereupon appear in the furnace atmosphere in the form of dust-like particles. These particles appear to be those which promote the formation of physical and chemical blue powder when the zinc vapor-bearing smelting gases are cooled to effect condensation of the zinc.

We have found that smelting temperatures not in excess of 1450° C. can be established in a zinciferous charge in an electric furnace when the charge is heated essentially, if not virtually exclusively, by contact with the hot slag which is produced in the course of the smelting operation and which is not permitted to exceed a temperature of 1450° C. when measured as the temperature of the slag as tapped from the furnace. Thus, we have found that a zinciferous charge can be smelted effectively while the charge, in the form of a loose mass of discrete particles, floats on the surface of the slag which is maintained fluid at temperatures of at least about 1100° C. The smelting appears to take place in the interface between the surface of the slag and the adjoining lower portion of the floating mass of zinciferous charge. The smelting operation is endothermic and, as a result, the fresh charge has a high capacity for the absorption of heat from the surface of the slag both by contact and by virtually black body radiation conditions. This absorption of heat from the slag serves to control the temperature of that portion of the slag in contact with the fresh charge and makes possible the maintenance of smelting conditions wherein the temperature does not exceed the maximum 1450° C. temperature of the slag.

In the course of this smelting operation, the zinc, cadmium, lead, copper and silver oxides are readily reduced. It will be appreciated that as the amount of these metals in the unreduced condition is depleted from the portion of the charge in contact with the fluid slag, the capacity of the charge to absorb heat from the slag, and thereby control its temperature, is diminished. Accordingly, as the degree of reduction of zinc and the other readily reducible metals approaches that of complete reduction, the remainder, having no further capacity for absorbing heat, becomes overheated and leads to the volatilization of the dust-forming constituents of the ore. However, we have discovered that, compared to the other readily reducible components of the zinciferous ore, iron oxide is reduced with somewhat more difficulty. Thus, we have found that if a sufficient quantity of iron oxide is present in the smelting charge, all of the zinc content of the charge can be reduced while some iron oxide remains unreduced. The presence of unreduced iron oxide and carbon in the charge as the reducible zinc content of the charge approaches zero serves to maintain in the charge a reducible mixture (the iron oxide and carbon) which is sufficiently capable of absorbing heat by endothermic reduction of the iron oxide as to assume the function of the reducible zinc material in controlling the smelting temperature. It will be appreciated that for the iron oxide to perform this function it is necessary for some of the iron oxide to be actually reduced with the resulting production of metallic iron. We have discovered that if the zinciferous ore charged to the electric furnace is accompanied by sufficient iron oxide, with relation to the proportions of carbon and other readily reducible metals in the ore, as to form by its partial reduction a metallic iron product and to leave unreduced at least 1½% iron oxide, expressed in terms of iron (Fe) by weight of the slag composition in which it dissolves, virtualy all of the zinc component of the ore can be reduced to produce a substantially zinc-free slag and metallic zinc vapor substantially free from dust-forming impurities. It has been our experience that when all of the zinc component of the ore has been reduced, virtually all of the cadmium, lead, copper and silver in the ore will also have been reduced.

The production of a metallic iron product in accordance with our invention necessitates a further control of the amount of unreduced iron oxide remaining in the slag. Metallic iron formed by reduction of the iron oxide has a sufficient avidity for carbon to pick up, as it is produced in the smelting zone, an amount of carbon such as to render the iron molten at temperatures of about 1150°–1450° C. prevailing in the smelting zone. The metallic iron, being heavier than the slag, sinks to the bottom of the furnace and accumulates therein. Inasmuch as the smelting heat is supplied to the furnace through the medium of the slag in accordance with our invention, the temperature prevailing in the lower portion of the furnace below the slag will generally be somewhat lower than that of the slag itself. In order to make possible continuous operation of the furnace, the metallic iron must be maintained in a tappable molten state while the smelting operation proceeds at a temperature not in excess of 1450° C. The iron will have a melting point below 1450° C. if it contains at least 1½ to 2% carbon, and if the supernatant slag is not unduly oxidic the iron will automatically be carburized to this necessary extent by the carbonaceous material present in the charge. We have found that slags containing more than about 6% iron oxide (calculated as Fe) are so oxidic as to preclude carburization of the iron to the requisite extent. At the other extreme, the iron product will contain about 4% carbon, and will be molten at a temperature of about 1150° C., when the slag contains iron oxide to the extent of only 1½% by weight expressed as Fe. Accordingly, by appropriate correlation of the charge constituents as described hereinbefore in order to produce a slag which not only contains at least 1½% iron in the form of iron oxide but which also contains not more than about 6% iron in the form of iron oxide, the production of a molten iron product will be assured while maintaining a smelting temperature not in excess of 1450° C. With this charge correlation it is possible to continuously smelt a zinciferous ore charge under conditions pursuant to our novel method whereby complete reduction of the zinc is accomplished with the production of metallic zinc vapor substantially free from dust-forming impurities.

The amount of iron oxide which should be present in the furnace charge cannot be stated with analytical certainty. As pointed out hereinbefore, the iron oxide content of the charge should at least be sufficient to provide in the slag at least 1½% iron (Fe) in the form of iron oxide. In addition, the charge should contain sufficient iron oxide to provide, by virtue of its reduction by the carbonaceous material as the zinc component of the ore approaches the state of complete reduction, the degree of heat absorption required to maintain a smelting temperature below about 1450° C. In general, the iron oxide content of the charge should be of the order of at least 2 to 3% iron (Fe) by weight of the metalliferous portion thereof (i. e. excluding the weight of reducing material and extraneous flux, if any). Thus, oxidic zinciferous ores containing as little as 2 to 3% iron (Fe) can be smelted effectively in accordance with our invention without requiring the addition of extraneous amounts of iron oxide. Zinciferous ores running lower than about 2% iron should be supplemented by an additional amount of iron oxide from any appropriate source. There is no critical upper limit to the amount of iron oxide which may be contained in the charge smelted in accordance with our invention, the only limits being those dictated by economy inasmuch as the smelting of excess iron oxide wastefully consumes electric power and reducing material.

The reducing materials useful in practicing our invention are those solid carbonaceous materials conventionally used in metallurgical smelting operations. Thus, coal and coke may be used with particular advantage and preferably in the form of particles ranging from a maximum of about ½ inch in diameter down to those of dust coal. The amount of carbonaceous material used in practicing our invention should be such as to effect substantially complete reduction of the zinc oxide of the ore, along with the relatively small accompanying amounts of lead, cadmium, copper and silver oxides, as well as reduction of such an amount of the iron oxide content of the charge as to leave unreduced in the slag at least 1½% iron in the form of iron oxide. Control of the amount of carbon in the charge may be effected by occasional analysis of the slag, the correct proportion of carbon in the charge being indicated by the presence of at least 1½% and not more than 6% iron in the form of iron oxide in the slag. The carbon should not be permitted to accumulate in excessive quantities inasmuch as it appears to collect in the molten slag-solid charge interface where it functions as an insulator and interferes with heat transfer between the slag and charge. An excess of carbon also lowers the iron oxide content of the slag below 1½% with the result, inter alia, of an increase in slag viscosity which, in turn, also lowers the effectiveness of heat transfer from the slag to the charge. Impairment of such heat transfer leads to the development of excessive slag temperatures with attendant disadvantages fully described hereinbefore.

The maintenance of the aforementioned iron oxide component in the slag and the maintenance of a smelting temperature not in excess of 1450° C. (as measured by the temperature of the slag as tapped) are significant features of the method of our invention. It is the combination of these features which makes possible the smelting of the ore in such manner as to produce metallic zinc vapor containing at most only an unobjectionable amount of volatilized dust-forming impurities. The zinc component of the ore, as well as the other readily reducible metals therein, tends to prevent fusion of the charge. As a result there is little if any tendency for the ore to fuse or melt at smelting temperatures below about 1450° C. until substantially all of the heat-absorbing zinc and other readily reducible metal oxides have been removed from the charge by the smelting operation. It is therefore possible, provided a smelting temperature not in excess of 1450° C. is maintained, to effect smelting of the ore while it floats on the surface of the molten slag layer with attendant advantages as described hereinafter. The gangue constituents of the ore, after the reducible metals have been eliminated by smelting, or a relatively fusible mixture and become the slag through the medium of which heating of the charge is effected in accordance with our invention.

In the course of our experimental work we endeavored to heat the electric smelting furnace by the conventional practices of open-arc heating and slag resistance heating. Neither of these procedures would produce the desired zinc vapor porduct low in volatilized dust-forming impurities even when the aforementioned iron oxide content of the slag was present. Open-arc heating, to the extent necessary to heat the charge to a smelting temperature, caused such excessive local overheating adjacent the arc as to volatilize large amounts of the dust-forming impurities. We then attempted to heat the furnace essentially by slag resistance heating, and for this purpose we carried out the smelting operation in such manner as to produce a relatively thick slag layer and maintained the electrodes sufficiently immersed in the slag as to produce a steady heating current indicative of the substantial absence of arcing. It was found that the smelting of the fresh charge adjacent the surface of the slag absorbed heat at such a rate, compared to the rate of heat input to the slag by means of slag resistance heating, as to chill the surface of the slag layer. As this chilling took place, the resistance of the relatively cool slag increased and caused the current to flow through only the lowermost relatively hot portion of the slag layer in a path that included the molten iron layer. As a result, the surface of the slag layer soon froze and it became virtually impossible to smelt any further charge addition.

We have found that zinciferous ores can be satisfactorily smelted in an electric furnace only by a combination of submerged arc and slag resistance heating. The submersion of each electrode, regardless of the number of electrodes used or their electrical connection, should be such as to provide a calculated peripheral arc resistance within the range of 0.2 to 0.8 inch-ohm, and preferably within the range of 0.3 to 0.6 inch-ohm. The voltage drop at an electrode divided by the current flowing through the electrode is known as the electrode arc resistance. The mathematical product of this calculated resistance and the periphery of the electrode is the peripheral resistance of the electrode expressed in terms of inch-ohms. In ascertaining this peripheral resistance for use in accordance with the aforementioned prescription, the periphery should be calculated from the original diameter of the electrode prior to its corrosion or attack within the furnace. When the electrode voltage and its degree of immersion in the slag (and hence the current flow) are appropriately correlated to the electrode diameter to establish and maintain a peripheral-resistance value within the aforementioned range of 0.2 to 0.8 inch-ohm at each electrode, we have found that the resulting multiplicity of small arcs about the electrode is conducive to effective heating of the slag without causing appreciable volatilization of the dust-forming constituents in the slag or charge. These small arcs are buried in the slag at the at the interface of the electrode and slag instead of being generated as long, hot arcs above the slag. The numerous small arcs at the interface cause a rapid churning of the slag when the slag possesses appropriate fluidity as pointed out hereinafter; this churning carries away the heat rapidly and uniformly so as to prevent the formation of a hot spot. The heat thus supplied to the slag aids in maintaining the upper portion of the slag layer at a fluidizing temperature and insures the maintenance of a path of electric current flowing between electrodes through the upper portion of the slag. The resulting heating of the slag between electrodes by the passage of electric current therethrough further aids in maintaining the slag layer in a fluid condition. Accordingly, this combination of submerged arc and slag resistance heating is characterized by the generation of sufficient heat in the upper portion of the slag layer to supply the endothermic heat requirements of the smelting operation without effecting undue chilling and freezing of the slag layer and without producing such localized overheating as to volatilize dust-forming impurities along with the evolved zinc vapor. It will be appreciated, however, that the success of this combined submerged arc and slag resistance heating of the slag to effect smelting of the charge is dependent upon the maintenance of a fluid slag.

The maintenance of a fluid slag plays an important role in our smelting procedure inasmuch as it makes possible effective submersion of the electrodes and satisfactory distribution of heat throughout the slag body. We have found that control of the slag fluidity can readily be achieved by conventional adjustment of the basic and acidic constituents of the slag. In the course of the smelting operation most of the iron component of the ore is reduced to metallic iron which collects any copper and a substantial portion of any silver and gold present in the ore, and virtually all of the zinc component of the ore is removed as metallic zinc vapor which carries with it the lead and cadmium components of the ore as well as the remainder of any silver and gold present in the ore. As a result, only gangue constituents remain as the slag, these gangue constituents being supplemented by the limited amount of iron oxide which is deliberately allowed to remain in the slag in accordance with our invention. The gangue constituents consist predominantly of lime and silica in the case of most zinciferous ores and are generally accompanied by relatively small amounts of magnesia and alumina, augmented by the presence of similar gangue-like constituents present in the coal ash. The relative proportions of these slag-forming constituents should be so controlled as to produce a slag having a sufficient fluidity to permit the ready settling therethrough of molten iron produced in the smelting zone and to permit the development in the slag body of thermal convection circulation within the normal operating temperature range of about 1100° to 1450° C. A slag fluidity sufficient to promote appreciable thermal circulation by convection within the slag layer facilitates distribution therethrough of heat generated at the submerged arcs and in the slag between the electrodes. The resulting uniform temperature conditions maintained within the slag layer contribute to an important extent to our ability to smelt zinciferous ores in an electric furnace without undue volatilization of dust-forming impurities along with the evolved zinc vapor.

The relatively uniform temperature of the surface of the slag layer is taken advantage of, in accordance with our invention, as a means of imparting to the fresh charge the necessary smelting heat. To this end, we have found it advisable to deliver the charge to the furnace in such manner, advantageously through the furnace roof, as to provide a mass of the charge floating on the slag in the vicinity of the electrodes. From time to time an additional charge may be introduced with advantage adjacent the furnace walls in such manner as to provide a downwardly and inwardly sloping bank of charge which not only protects the furnace walls but supplies an additional quantity of fresh charge available for absorbing heat from the slag. We have found, however, that charging solely adjacent the side walls of the furnace requires heating of the charge essentially by radiation and that this type of heating leads to the development of excessive slag temperatures which unduly promote the volatilization of dust-forming constituents of the charge. When the charge is delivered principally to the surface of the slag pursuant to the method of our invention, the charge is heated substantially exclusively by the heat transmitted thereto from the slag. Although the slag is heated by the submerged arc and by the electric current flowing through the slag itself, overheating of the slag is prevented by the absorption of heat by the relatively cool and reducible material in the charge. This absorption of heat tends to cool the surface of the slag and thereby provides a temperature-controlling buffer which prevents the development in the charge of a smelting temperature in excess of about 1450° C. Accordingly, the manner in which the fresh charge is smelted and is in turn used as a temperature controlling medium in accordance with our invention is particularly conducive to the liberation from the smelting zone of zinc vapor free from such an amount of volatilized dust-forming impurities as would appreciably interfere with the condensation of the zinc vapor to molten metal.

Condensation of the zinc vapor-bearing smelting gases produced in accordance with our invention can be readily accomplished with high efficiency. Although the zinc vapor may be effectively condensed in stationary baffle-type condensers such as that described in the United States patent to Bunce No. 1,873,861, condensation can be effected with particular advantage in a condenser of the type wherein the zinc vapor is brought into intimate contact with a relatively large freshly exposed surface of molten zinc. The latter type of condenser is represented by that wherein the zinc vapor-bearing gases are passed through a shower of molten zinc forcibly hurled through a confined condensing zone as described in United States Patents Nos. 2,457,544 through 2,457,551 and 2,494,551. This latter type of zinc condenser is capable of removing and condensing to molten metal all of the zinc vapor contained in the smelting gases except for that amount of the vapor corresponding to the vapor pressure of molten zinc at the temperature of the exhaust condenser gases.

When smelting zinciferous ores in an electric furnace pursuant to our invention, the temperature of the carbon monoxide-containing furnace gases, being considerably below that prevailing in the smelting zone, is frequently of the order of 900–1000° C. As is well known, carbon monoxide tends to dissociate appreciably at temperatures of about 900° C. and below into carbon dioxide and carbon. The carbon dioxide is a powerful oxidizing agent for zinc vapor and by its presence tends to produce rock oxide accretions and blue powder. If, however, an appreciable amount of nascent carbon is suspended in the furnace gases the presence of carbon dioxide therein can be substantially completely eliminated. Such a suspension of nascent carbon in the furnace atmosphere may be obtained by introducing into this atmosphere an amount of a crackable hydrocarbon such that when it is cracked in situ at the prevailing furnace atmosphere temperature it will yield a cloud of soot-like particles of nascent carbon. The carbon particles, being both nascent and incandescent as they float through the furnace gases, appear to be phenomenally effective in reducing the carbon dioxide content of these gases.

The crackable hydrocarbon must be introduced into the furnace atmosphere for cracking in situ therein and not into the smelting zone where it could be preferentially consumed in the smelting operation. For example, the crackable hydrocarbon may be introduced in the form of liquid fuel oil, kerosene, gas oil, or the like, by allowing it to drip into the furnace atmosphere. A permanent crackable gas, such as natural gas, acetylene, or the like, may also be introduced through a tube into the interior of the furnace atmosphere. Particularly effective results have been obtained by introducing the crackable hydrocarbon in an ostensibly solid form as the volatile component of bituminous coal. When some of the anthracite coal or coke used as the reducing material for the smelting operation is replaced by the equivalent amount of bituminous coal based on its solid carbon content, the volatile matter in this bituminous coal present in the charge floating on the molten slag layer is quickly liberated into the furnace atmosphere without being appreciably consumed by the smelting operation. The amount of crackable hydrocarbon used for this purpose is not critical, the carbon dioxide content of the furnace gases being progressively decreased by increasing amounts of crackable hydrocarbons introduced thereinto.

The only requirement for the physical form of charge used in practicing our invention is that it be loose and dry. By "loose" we mean that the charge should not be introduced in massive form, say, for example, as a single large sintered block. The charge should be loose so that it will fall freely on the surface of the molten slag and spread out thereupon to an extent commensurate with the angle of repose of the charge particles. By specifying that the charge should be "dry" we mean that it should not be added in the molten condition. It is a characteristic feature of the smelting method of our invention that the charge be smelted on the surface of the hot fluid furnace slag, and this condition can be met only when the charge is introduced into the furnace in the aforementioned loose dry form.

The degree of subdivision of the ore component of the charge is not critical. For example, we have charged directly to the electric furnace in accordance with our invention a flash roasted ore of which 6.6% was retained on 200 mesh (Tyler Standard), 4.4% was retained on 325 mesh, and 89% was minus 325 mesh. We have also smelted sintered zinciferous ore the particles of which ran as large as ½ inch in diameter. Crude zinciferous ore has also been successfully smelted where the particles of ore ran about ¼ inch in diameter and finer. In general, we prefer to limit the maximum particle size of the ore in the charge to about ½ inch in diameter. Except for the problem of dusting there is no critical lower limit to the size of any of the charge particles.

Although the charge components can be charged separately onto common areas of the slag surface, we prefer to mix the charge components prior to their introduction into the furnace either in the form of a simple physical admixture or in the form of nodulized or otherwise agglomerated particles of the size of conventional coal briquettes. The charge may also be preheated with advantage to temperatures of the order of 400°–800° C. in accordance with conventional electric furnace practice. Any suitable preheating apparatus may be used for this purpose, the heat being supplied by an oil or gas flame or by the heat of combustion of the exhaust gases from the zinc condenser.

The smelting method of our invention may be illustrated by the following specific example. A charge mix was made up of 15 parts of anthracite, 2 parts of bituminous coal, and 6 parts of lime as an extraneous flux per 100 parts by weight of an ore mixture composed of sintered Buchans River, New Calumet and green ore residues consisting of discrete articles of ⅜ inch diameter and finer. The ore mixture had the following analysis:

| | | |
|---|---|---|
| Zn | percent | 60.0 |
| Fe | do | 6.6 |
| Pb | do | 3.0 |
| Cd | do | 0.12 |
| Cu | do | 0.81 |
| Ag | oz./ton | 3.9 |
| Au | do | 0.01 |
| CaO | percent | 1.3 |
| $SiO_2$ | do | 4.5 |
| MgO | do | 0.44 |
| $Al_2O_3$ | do | 1.1 |

This charge mixture contained sufficient iron oxide and other slag-forming constituents to meet the operating requirements of our smelting method.

The charge mix was preheated in an oil-fired kiln to a temperature of about 500° C. and was charged at intervals of 6 minutes successively through a series of six charging holes positioned close to the electrodes in the roof of the furnace. The furnace was a single phase, two 6-inch diameter electrode, 500 kilowatt furnace of conventional design. The furnace was operated at 300 kilowatts with the charge introduced at the rate of 4 tons per day. The two electrodes were immersed a variable amount ranging between 3 to 6 inches in the slag layer, the depth of immersion being determined by the amount of submersion of the electrodes required to maintain submerged arc operation as indicated by the mildly fluctuating current of the order of 3000 amperes with an electrode tip voltage of 60 volts. Heating of the furnace was effected by a combination of submerged arc and slag resistance heating. The zinc vapor-bearing smelting gases were drawn off into a splash-type condenser substantially identical with that shown and described in our aforementioned Patent No. 2,494,551. Due to the methods of preheating and of charging the furnace, as well as occasional opening of the furnace and condenser for inspection purposes, only 81.5% of the zinc content of the ore charged to the preheater was recovered. The outstanding effectiveness of our smelting operation is indicated more accurately by the composition of the slag which shows the degree of elimination of the reducible metal oxides from the charge. Analyses of the composite slag produced in the course of 4 days of continuous operation as described hereinbefore show that only 0.33% of the zinc, 0.4% of the lead, less than 0.5% of the cadmium, 1.0% of the copper, 0.4% of the silver and less than 1% of the gold present in the charge to the preheater remained in the slag, the balance of these components being obtained in recoverable form in the condensed zinc metal and pig iron product. The zinc vapor was condensed with nearly 93% efficiency expressed in terms of the proportion of the incoming zinc vapor recovered in the form of molten metal in the condenser. The molten pig iron product was tapped at intervals and contained about 2% carbon. The slag was similarly tapped at intervals at a tapping temperature of about 1250° C. and contained an average of 2.5% iron (Fe) in the form of iron oxide.

It will be seen, accordingly, that our invention offers a commercially attractive method of smelting zinciferous ores in an electric furnace. The method does not require anything other than conventional electric furnace equipment for the smelting operation and not only produces zinc metal but also a pig iron product both of which function as collectors for valuable metal byproducts which can be readily recovered by conventional means. Under normal operating conditions in a commercial scale furnace there appears to be every reason to expect a recovery of 96–97% of the zinc component of the ore in the form of condensed molten zinc containing only those impurities which are now removed therefrom by conventional rectification. Substantially complete recovery of the lead, cadmium, copper, silver and gold contents of the zinciferous ore can be realized in accordance with our invention, the lead, cadmium and some of the silver and gold being recovered from the condensed metallic zinc and the copper and the balance of the silver and gold being recoverable from the iron product in a copper converter or the like.

We claim:

1. The method of smelting an oxidic zinciferous ore with solid carbonaceous reducing material in an electric furnace with the resulting production of a substantially zinc-free molten slag and metallic zinc vapor which comprises introducing into the furnace a charge comprising the zinciferous ore, iron oxide and an amount of said reducing material sufficient to effect reduction of all of the zinc oxide component of the ore to metallic zinc and to effect reduction of such an amount of the iron oxide as to form a body of molten iron product underlying said slag but to leave in the slag at least 1½% and not more than about 6% by weight of iron oxide (calculated as Fe), the charge introduced into the furnace being in the form of a loose mass of discrete particles and its introduction being at such rate as to permit the charge to float on the surface of the slag and be heated to smelting temperature by contact with the slag, and supplying heat to the slag so as to maintain a slag temperature not in excess of 1450° C. but sufficient to effect said smelting of the charge while floating on the slag by submerging the furnace electrodes in the molten slag to such an extent as to heat the slag by a combination of submerged arc and slag resistance heating and thereby avoiding exposure of the floating charge to an open arc, said smelting of the floating charge resulting in the formation of smelting gases containing metallic zinc vapor free from such an amount of volatilized dust-forming impurities as to appreciably interfere with the condensation of the zinc vapor to molten metal.

2. The method of producing molten zinc metal directly from anoxidic zinciferous ore by smelting of the ore with solid carbonaceous reducing material in an electric furnace with the resulting production of a substantially zinc-free molten slag and metallic zinc vapor condensable to molten metal which comprises introducing into the furnace a charge comprising the zinciferous ore, iron oxide and an amount of said reducing material sufficient to effect reduction of all of the zinc oxide component of the ore to metallic zinc and to effect reduction of such an amount of the iron oxide as to form a body of molten iron product underlying said slag but to leave in the slag at least 1½% and not more than about 6% by weight of iron oxide (calculated as Fe), the charge introduced into the furnace being in the form of a loose mass of discrete particles and its rate of introduction being such as to permit the charge to float on the surface of the slag and be heated to smelting temperature by contact with the slag, supplying heat to the slag so as to maintain a slag temperature not in excess of 1450° C. but sufficient to effect said smelting of the charge while floating on the slag by submerging the furnace electrodes in the molten slag to such an extent as to heat the slag by a combination of submerged arc and slag resistance heating and thereby avoiding exposure of the floating charge to an open arc, and condensing the evolved zinc vapor as molten zinc metal.

3. The method of producing molten zinc metal directly from an oxidic zinciferous ore by smelting of the ore with solid carbonaceous reducing material in an electric furnace with the resulting production of a substantially zinc-free molten slag and metallic zinc vapor condensable to molten metal which comprises introducing into the furnace a charge comprising the zinciferous ore, extraneous iron oxide and an amount of said reducing material sufficient to effect reduction of all of the zinc oxide component of the ore to metallic zinc and to effect reduction of such an amount of the iron oxide as to form a body of molten iron product underlying said slag but to leave in the slag at least 1½% and not more than about 6% by weight of iron oxide (calculated as Fe), the charge introduced into the furnace being in the form of a loose mass of discrete particles and its rate of introductiong being such as to permit the change to float on the surface of the slag and be heated to smelting temperature by contact with the slag, supplying heat to the slag so as to maintain a slag temperature not in excess of 1450° C. but sufficient to effect said smelting of the charge while floating on the slag by submerging the furnace electrodes in the molten slag to such an extent as to heat the slag by a combination of submerged arc and slag resistance heating and thereby avoiding exposure of the floating charge to an open arc, and condensing the evolved zinc vapor as molten zinc metal.

4. The method of producing molten zinc directly from an oxidic iron-bearing zinciferous ore by smelting of the ore with solid carbonaceous reducing material in an electric furnace with the resulting production of a substantially zinc-free molten slag and metallic zinc vapor condensable to molten metal which comprises introducing into the furnace a charge comprising the iron oxide-containing zinciferous ore and an amount of said reducing material sufficient to effect reduction of all of the zinc oxide component of the ore to metallic zinc and to effect reduction of such an amount of the iron oxide as to form a body of molten iron product underlying said slag but to leave in the slag at least 1½% and not more than about 6% by weight of iron oxide (calculated as Fe), the charge introduced into the furnace being in the form of a loose mass of discrete particles and its rate of introduction being such as to permit the charge to float on the surface of the slag and be heated to smelting temperature by contact with the slag, supplying heat to the slag so as to maintain a slag temperature not in excess of 1450° C. but sufficient to effect said smelting of the charge while floating on the slag by submerging the furnace electrodes in the molten slag to such an extent as to heat the slag by a combination of submerged arc and slag resistance heating and thereby avoiding exposure of the floating charge to an open arc, and condensing the evolved zinc vapor as molten zinc metal.

5. The method of producing molten zinc metal directly from an oxidic argentiferous and auriferous zinciferous ore by smelting of the ore with solid carbonaceous reducing material in an electric furnace with the resulting production of a substantially zinc-free and silver- and gold-free molten slag and metallic zinc vapor condensable to molten metal which comprises introducing into the furnace a charge comprising the zinciferous ore, iron oxide and an amount of said reducing material sufficient to effect reduction of all of the zinc oxide component of the ore to metallic zinc and to effect reduction of such an amount of the iron oxide as to form a body of molten iron product underlying said slag but to leave in the slag at least 1½% and not more than about 6% by weight of iron oxide (calculated as Fe), said molten iron product containing at least a substantial portion of the gold and silver present in the ore, the charge introduced into the furnace being in the form of a loose mass of discrete particles and its rate of introduction being such as to permit the charge to float on the surface of the slag and be heated to smelting temperature by contact with the slag, supplying heat to the slag so as to maintain a slag temperature not in excess of 1450° C. but sufficient to effect said smelting of the charge while floating on the slag by submerging the furnace electrodes in the molten slag to such an extent as to heat the slag by a combination of submerged arc and slag resistance heating and thereby avoiding exposure of the floating charge to an open arc, and condensing the evolved zinc vapor as molten zinc metal.

ERWIN C. HANDWERK.
GEORGE T. MAHLER.

REFERENCES CITED

The following references are of record in the file of this patent:

UNITED STATES PATENTS

| Number | Name | Date |
|---|---|---|
| 766,279 | Nagel | Aug. 2, 1904 |
| 976,557 | Dawson | Nov. 22, 1910 |
| 1,150,271 | Johnson | Aug. 17, 1915 |
| 1,425,661 | Kato | Aug. 15, 1922 |
| 1,738,910 | Lepsoe | Dec. 10, 1929 |
| 1,927,763 | Wejnarth | Sept. 19, 1933 |
| 2,096,779 | Bartholomew et al. | Oct. 26, 1937 |
| 2,396,658 | Hybinette et al. | Mar. 19, 1946 |
| 2,457,544 | Handwerk et al. | Dec. 28, 1948 |
| 2,488,568 | Striplin, Jr., et al. | Nov. 22, 1949 |

FOREIGN PATENTS

| Number | Country | Date |
|---|---|---|
| 600,434 | Great Britain | Apr. 8, 1948 |

OTHER REFERENCES

The Condensed Chemical Dictionary, by Gregory, 3rd Ed., published 1942 by Reinhold Publishing Corp., N. Y., page 671.